United States Patent [19]

Stoner

[11] 3,974,873
[45] Aug. 17, 1976

[54] METHOD FOR ATTACHING AN END FRAME AND ANOTHER STRUCTURAL COMPONENT OF A DYNAMOELECTRIC MACHINE

[75] Inventor: Jesse A. Stoner, DeKalb, Ill.

[73] Assignee: General Electric Company, Fort Wayne, Ind.

[22] Filed: Sept. 14, 1973

[21] Appl. No.: 397,425

[52] U.S. Cl. .............................. 164/108; 164/112; 164/333; 164/334; 164/335
[51] Int. Cl.² ........................................ B22D 19/04
[58] Field of Search ............... 164/80, 98, 108, 110, 164/112, 332, 333, 335–338; 264/261, 262

[56] References Cited
UNITED STATES PATENTS

| | | | |
|---|---|---|---|
| 564,770 | 7/1896 | Aiken | 214/715 |
| 898,631 | 9/1908 | Custer | 164/335 |
| 1,498,769 | 6/1924 | Wood | 164/333 X |
| 1,975,889 | 10/1934 | Whiteley | 164/112 X |
| 2,471,661 | 5/1949 | Stevenson | 164/110 X |
| 2,892,225 | 6/1959 | Buhrer et al. | 222/166 |
| 2,963,530 | 12/1960 | Hanks et al. | 164/80 X |
| 3,095,620 | 7/1963 | Peras | 164/326 |
| 3,398,782 | 8/1968 | Lauterjung | 164/336 |
| 3,601,179 | 8/1971 | Taylor | 164/258 X |
| 3,667,535 | 6/1972 | Thomas, Jr. et al. | 164/258 |

FOREIGN PATENTS OR APPLICATIONS

| | | | |
|---|---|---|---|
| 407,120 | 3/1934 | United Kingdom | 164/108 |

*Primary Examiner*—J. M. Meister
*Attorney, Agent, or Firm*—Joseph E. Papin

[57] ABSTRACT

A method of attaching an end frame and another structural component of a dynamoelectric machine wherein the structural component is positioned within a receiving means therefor in the end frame. At least one of the end frame and structural component is moved relative to the other thereof to an aligned position for assembly with each other, and metal is cast into the receiving means for forming a rigid tie between the end frame and the structural component for maintaining them in their aligned assembly position. Apparatus for rigidly interconnecting an end frame with another structural component of a dynamoelectric machine is also disclosed.

29 Claims, 12 Drawing Figures

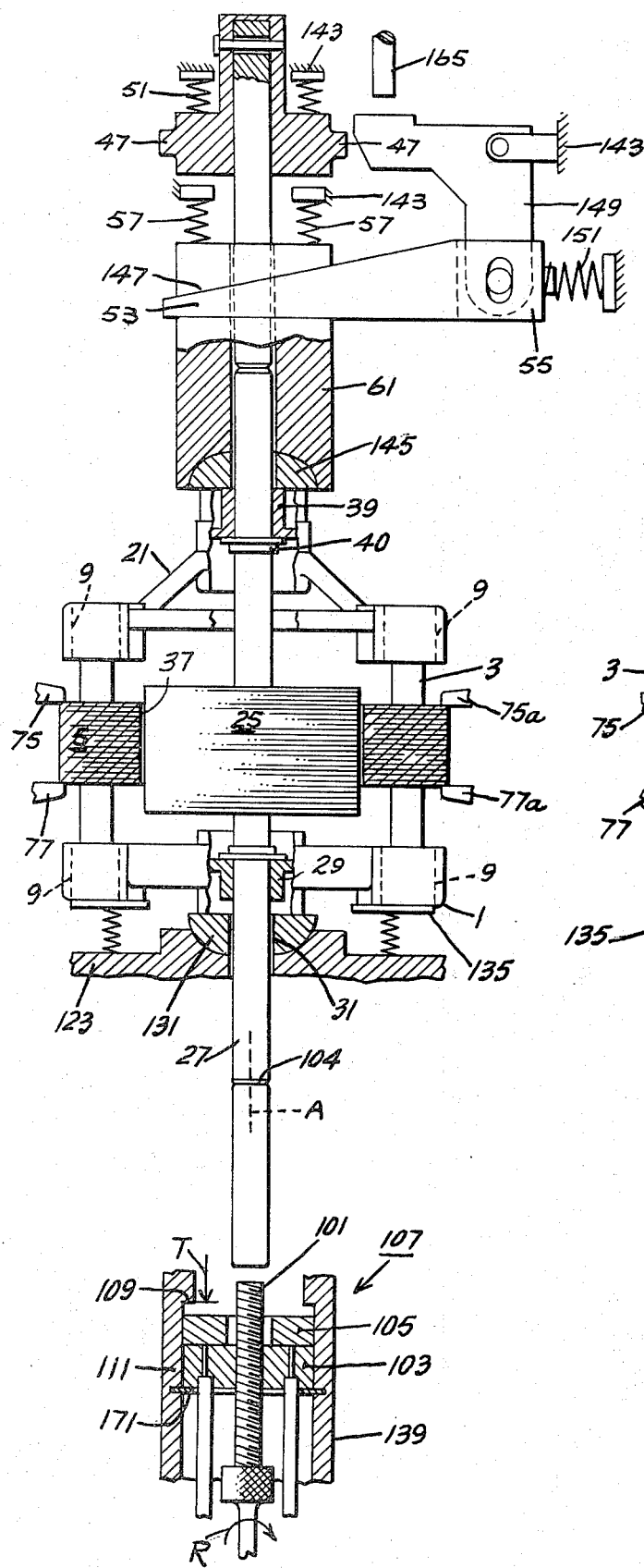
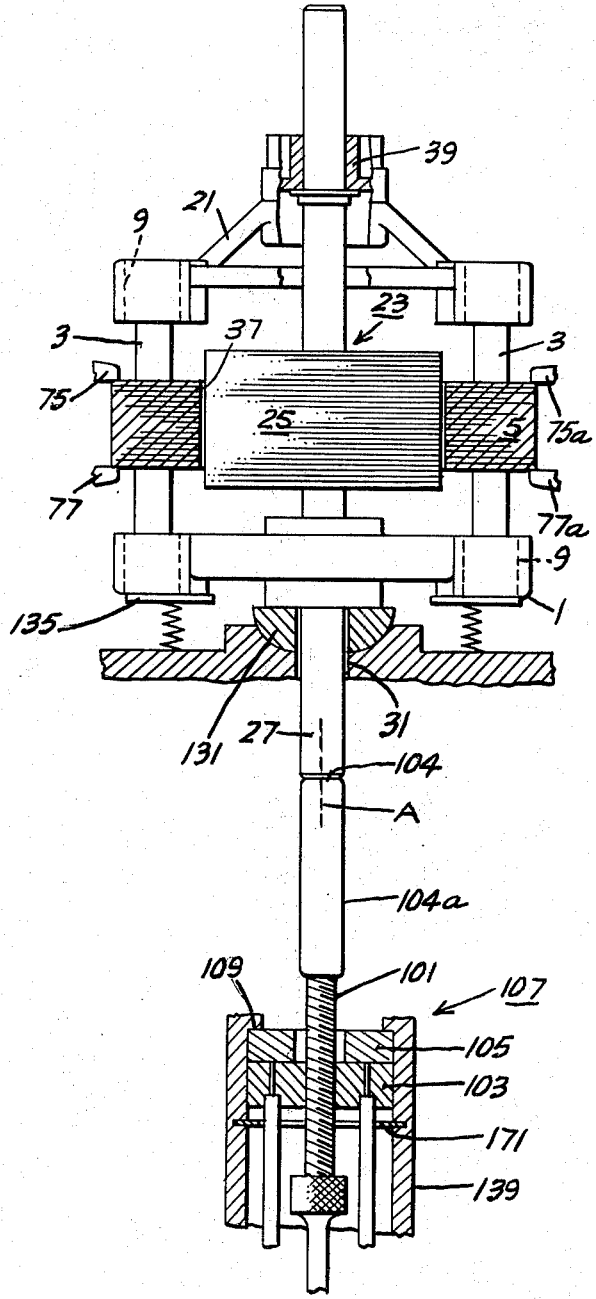

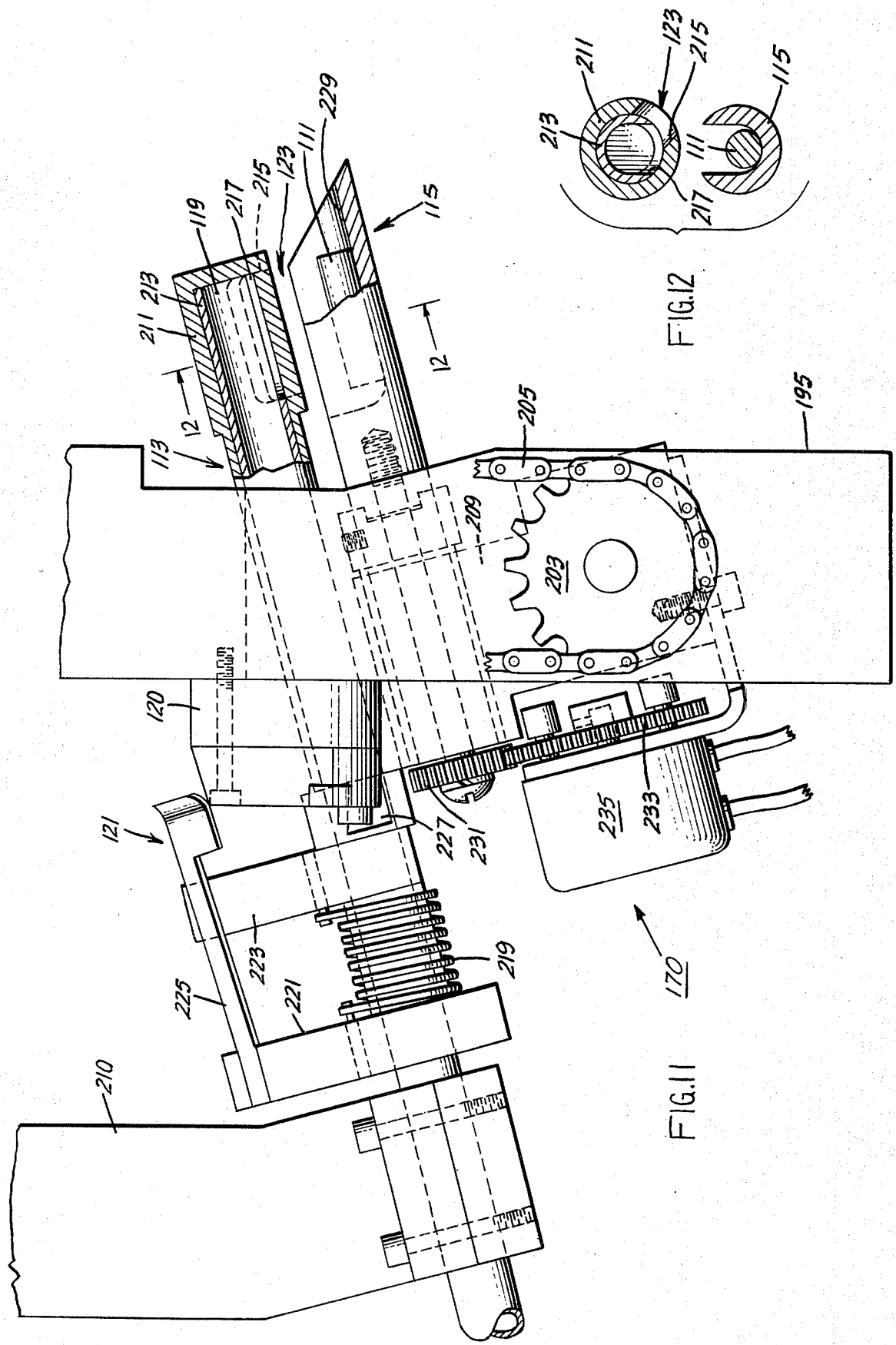

METHOD FOR ATTACHING AN END FRAME AND ANOTHER STRUCTURAL COMPONENT OF A DYNAMOELECTRIC MACHINE

RELATED PATENTS

This application for patent is related to copending application Ser. No. 397,297 filed Sept. 14, 1973 now U.S. Pat. No. 3,857,170, copending application Ser. No. 246,219 filed Apr. 21, 1972, copending application Ser. No. 397,693 filed Sept. 17, 1973, now U.S. Pat. No. 3,860,811 and copending application Ser. No. 358,589 filed May 9, 1973, now U.S. Pat. No. 3,858,067 all of which are assigned to the assignee of this application which is believed to patentably differentiate over the copending applications.

FIELD OF THE INVENTION

The present invention relates generally to methods and apparatus for casting metal and in particular to such methods and apparatus for attaching an end frame and another structural component of a dynamoelectric machine.

BACKGROUND OF THE INVENTION

In the manufacture of dynamoelectric machine, it is necessary that the rotatable assembly, such as a shaft and rotor for instance, be properly aligned both radially and axially with a cooperating stator. If radially misaligned, an eccentric air gap between the rotatable assembly and stator results thereby to effect a nonuniform flux path with poor electrical efficiencies and the mechanical deficiency of vibration, and if axially misaligned, an undesirably great amount of axial rotor thrust is produced. Of course, it is also necessary that the bearing means carried by the end frame construction of the dynamoelectric machine be aligned and in suitable journaling engagement with the rotatable assembly in order to provide proper longevity for such bearing means.

In the past, several different methods of assemblying dynamoelectric machines have been utilized to effect the above-mentioned proper radial and axial alignment of the rotatable assembly, stator and end frames of the dynamoelectric machine. For example, through-bolts have been used to interconnect the stator and end plates of a dynamoelectric machine with the rotatable assembly thereof journaled in the end plates; however, one of the disadvantageous or undesirable features of this construction was that rather close tolerances were required to attain proper alignment of the dynamoelectric machine components, and maintaining close tolerances manifestly results in increased machining and assembly costs of manufacture. Another past method of assembling dynamoelectric machines was to employ an oversized dummy rotatable assembly to effect the necessary alignment between the stator and end plate and thereafter substitute an actual rotatable assembly for the dummy rotatable assembly; however, one of the disadvantages or undesirable features of this method of construction was that it was limited to "unit bearing" type machines wherein the rotatable assembly is supported in only one end frame. As a result, this method was unavailable for use in the greater majority of dynamoelectric machines wherein the rotatable assembly is supported in oppositely disposed end frames.

In U.S. Pat. No. 3,165,816 shims were disposed between the rotatable assembly and stator to effect proper radial alignment therebetween, and a rocker arm mechanism was employed to maintain the rotatable assembly and stator in their proper assembled positions while an adhesive, such as a thermosetting resin, was applied between peripheral portions of the stator and flanges of opposite end plates closely spaced in overlapping relation with the stator peripheral portions thereby to bond the stator and end plates together. The rotatable assembly was, of course, disposed within the stator and; journaled in the end plates. While this patented method of obtaining proper alignment between the components of dynamoelectric machines undoubtedly had many salient features providing an advancement of the art, one of the problems generally attendant was that the adhesive was not positively confined between the stator peripheral portions and end plate flanges overlapping therewith wherein it might have been possible to effect displacement of the adhesive undesirably onto other portions of the stator or end plates.

In U.S. Pat. No. 3,705,994 another method of assembling dynamoelectric machines is disclosed wherein the opposite end frames thereof were welded to beams carried by the stator while the rotatable assembly was supported therein; however, one of the disadvantageous or undesirable features of this method was that the welds themselves, upon cooling, manifestly created stresses which tend to effect misalignment, as well known to the art.

In U.S. Pat. No. 2,892,225, there is disclosed a method of casting metal wherein molten metal in predetermined amounts are delivered directly from a source or furnace therefor to a casting ladle disposed adjacent to a mold, and the molten metal is then poured from the ladle into the mold. One of the disadvantageous or undesirable features of this past method of casting metal was that it was necessary not only to maintain the molten metal in the furnace at a predetermined temperature proper for the casting operations but it was also necessary to maintain such predetermined temperature of the molten metal as it was delivered from the source to the casting ladle. Since some metals, such as zinc, lead, aluminum or the like and various alloys thereof cool or solidify at a rather rapid rate, the time factor involved in delivering such molten metal from the source thereof to the casting ladle and casting it would, of course, be critical and relatively short.

The principle object of the present invention is to provide method and apparatus for attaching an end frame of a dynamoelectric machine and another structural component and also for casting metal which overcome the aforementioned disadvantageous or undesirable features of the past methods and apparatus, and this, as well as other objects and advantageous features of the present inventions, will be in part apparent and in part pointed out in the specification which follows.

SUMMARY OF THE INVENTION

In general, a method in one form of the invention for attaching an end frame and another structural component of a dynamoelectric machine comprises positioning the structural component within a receiving means provided therefor in the end frame, moving at least one of the end frame and structural component relative to the other thereof to an aligned position for assembly with each other, and providing a hardenable material, such as a metal in one exemplication of the invention, in the receiving means and flowing the hardenable material within the receiving means between at least a part of the end frame and at least a part of the structural component for forming a rigid tie therebetween to maintain the end frame and the structural component in their aligned assembly position upon the hardening of the hardenable material.

Further, and in general, apparatus of the invention for rigidly interconnecting an end frame with another structural component of a dynamoelectric machine is provided with means for moving the structural component into an aligned assembled position in spaced relation within receiving means provided therefor in the end frame, and means for casting metal into the receiving means thereby to establish a rigid connection between the end frame and the structural component.

BRIEF DESCRIPTION OF THE DRAWINGS

FIGS. 5 and 6 are schematic views of apparatus included in the apparatus for introducing end-play between the dynamoelectric machine components;

FIG. 11 is a side elevation, partially in cross-section of metal receiving, transferring and casting means of the apparatus of FIG. 10; and FIG. 12 is a sectional view along line 12—12 of FIG. 11.

Corresponding reference characters indicate corresponding parts throughout the several views of the drawing. The following examples illustrate the invention in one form thereof and are not to be construed as limiting in any manner.

DETAILED DESCRIPTION OF THE PREFERRED EMBODIMENT

Figure 1:
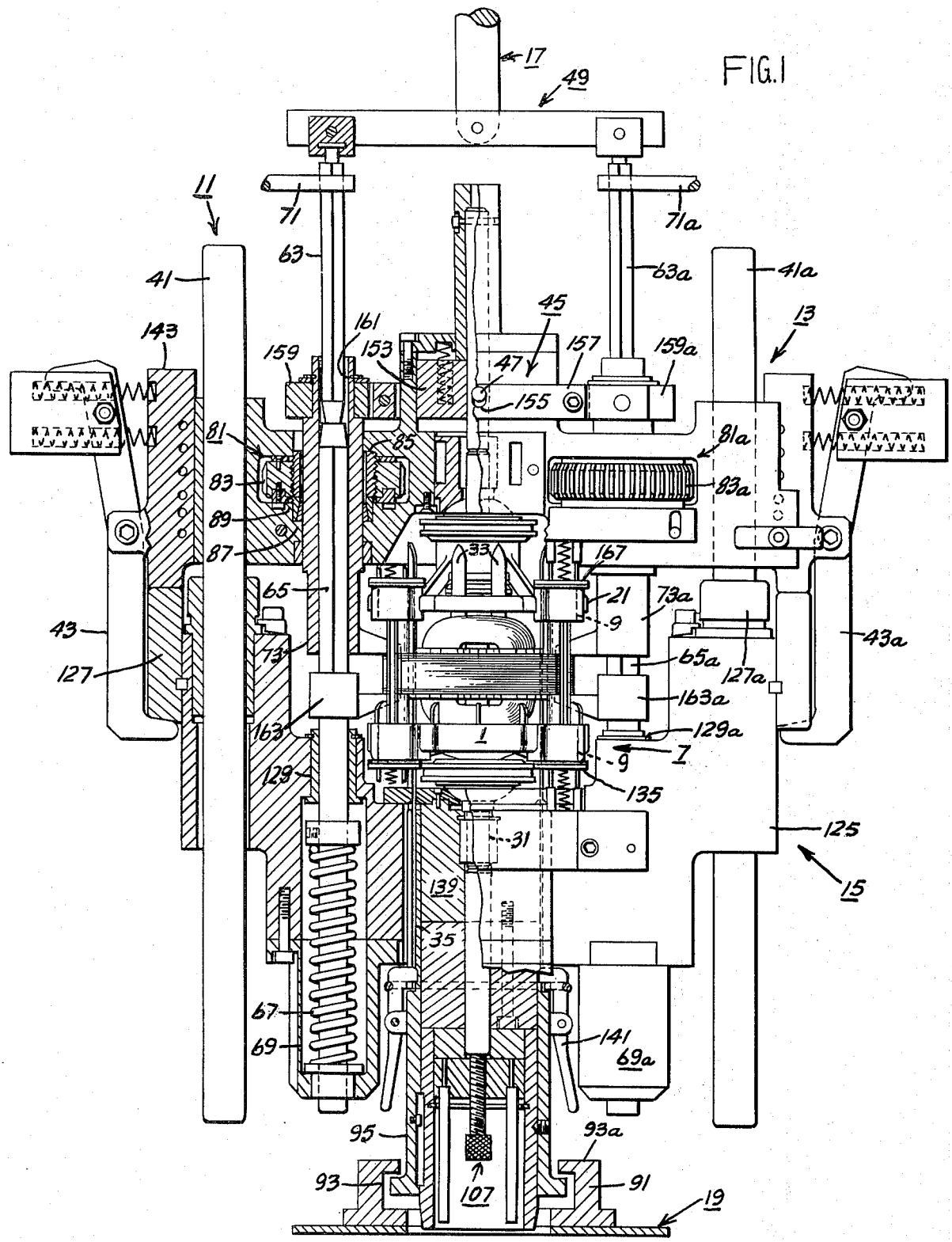
FIG. 1 is an elevational view, partially in cross-section of apparatus in one form of the present invention for effecting proper alignment of dynamoelectric machine components which may be employed to practice methods in one form of the present invention and taught thereby.

Referring now to the drawings in general, a method of attaching structural component or end frame 1 and another structural component, such as a plurality of beams 3 carried by a stationary assembly or stator or core 5, of a dynamoelectric machine 7, is shown by positioning the structural component within a receiving, accepting or encompassing means therefor, such as a plurality of recesses or socket means 9 in the end frame, as shown in FIG. 1. At least one of the end frame 1 and structural component 3 is moved relative to the other thereof to an aligned position for assembly with each other, as shown in FIG. 4, and a metal, such as zinc, lead or aluminum or the like or various alloys thereof, is cast into the receiving means for forming a rigid tie between the end frame and the structural component for maintaining them in their aligned positions, as shown in FIGS. 7–10.

Figure 2:
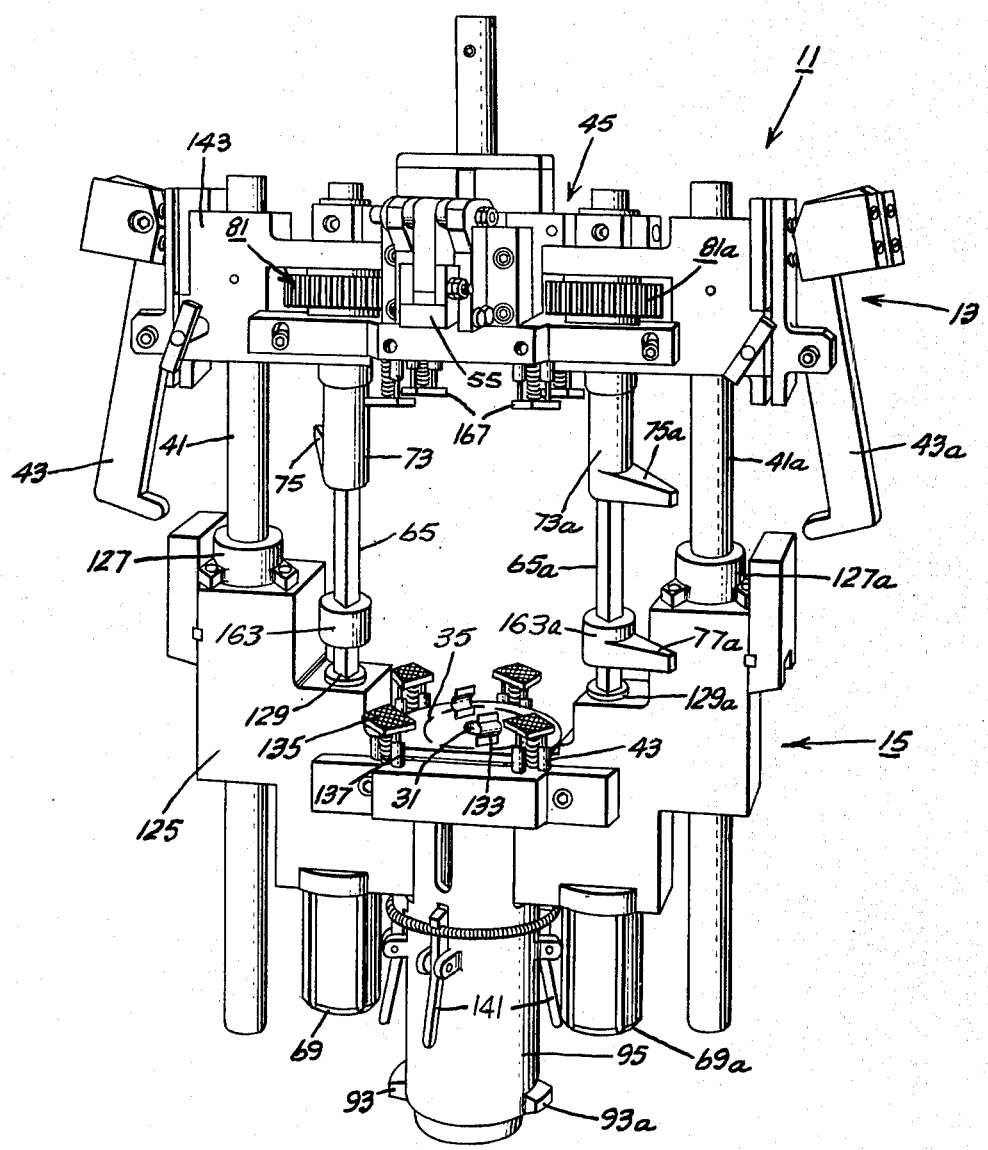
FIG. 2 is a perspective view of the apparatus of FIG. 1.

More particularly and as shown in FIGS. 1, 2 and 5, apparatus 11 for practicing the above-mentioned method for attaching end frame 1 and beams 3 of dynamoelectric machine 7 may be assumed to be selectively located at a work loading station of an automatic motor assembly machine (not shown) and movable therein to a casting station where the metal is cast into receiving means 9 thereby to form the rigid tie between the end frame and the structural component of the dynamoelectric machine. With apparatus 11 positioned at the work loading station of the automatic motor assembly machine, lower end frame 1 is initially placed in a predetermined position on the lower one of upper and lower assembly fixtures 13, 15 which along with upper and lower slides or mechanisms, indicated generally at 17, 19, of the machine constitute a means for positioning the lower end frame, upper end frame 21 and rotatable assembly 23, which includes rotor 25 and shaft 27, with stator 5 for assembly to compensate for out-of-square upper and lower ends or faces of the stator. With lower end frame 1 disposed on lower fixture 15, bearing means 29 of the lower end frame is disposed over a locating or referencing means, such as an aperture or shaft receiving hole 31 in the lower fixture, and shaft 27 has its lower end portion inserted through the bearing means for journaling engagement therewith and into locating engagement with locating aperture 31. In this manner, rotatable assembly 23 is positively located relative to lower end plate 1 thereby to predeterminately position or locate an axis A of the rotatable assembly in a substantially perpendicular position. With rotatable assembly 23 and lower end frame 1 disposed in this predetermined position on lower fixture 15, shim means, such as a plurality of shim strips 33, are protractively moved upwardly through a plurality of circularly disposed slots 35 provided therefor in the lower fixture, as shown in FIG. 2, and through apertures (not shown) in the lower end frame to shimming positions disposed about the periphery of rotor 25. A bore 37 of stator 5 is manually positioned or placed about the periphery of rotor 25 by an operator with the lower end portions of beams 3 disposed within sockets 9, and in this manner, shims 33 are interposed in shimming engagement between the rotor periphery and the stator bore to predetermine the air gap therebetween upon the movement of the dynamoelectric machine components to their final assembly positions, as discussed hereinafter. A bearing means 39 which is provided in upper end frame 21 is placed over the upper or opposite end portion of shaft 27 for journaling engagement therewith with sockets 9 of upper end frame 21 received about the upper end portion of stator beams 3. Bearing 39 is disposed in engagement with a trust washer 40 or the like which is fixedly positioned on the upper end portion of shaft 27.

Upper fixture 13 carries guide shafts or rods 41, 41a which are suitably journaled in lower fixture 15, and actuation of upper slide 17 by suitable means (not shown) moves the upper fixture downwardly into abutment with the lower fixture. A pair of fixture locking means or levers 43, 43a, which are pivotally and resiliently mounted on upper fixture 9, are swung or resiliently urged inwardly into locking engagement with a mating part of lower fixture 11 thereby to secure the upper and lower fixtures together against displacement in closed position thereof.

Figure 4:
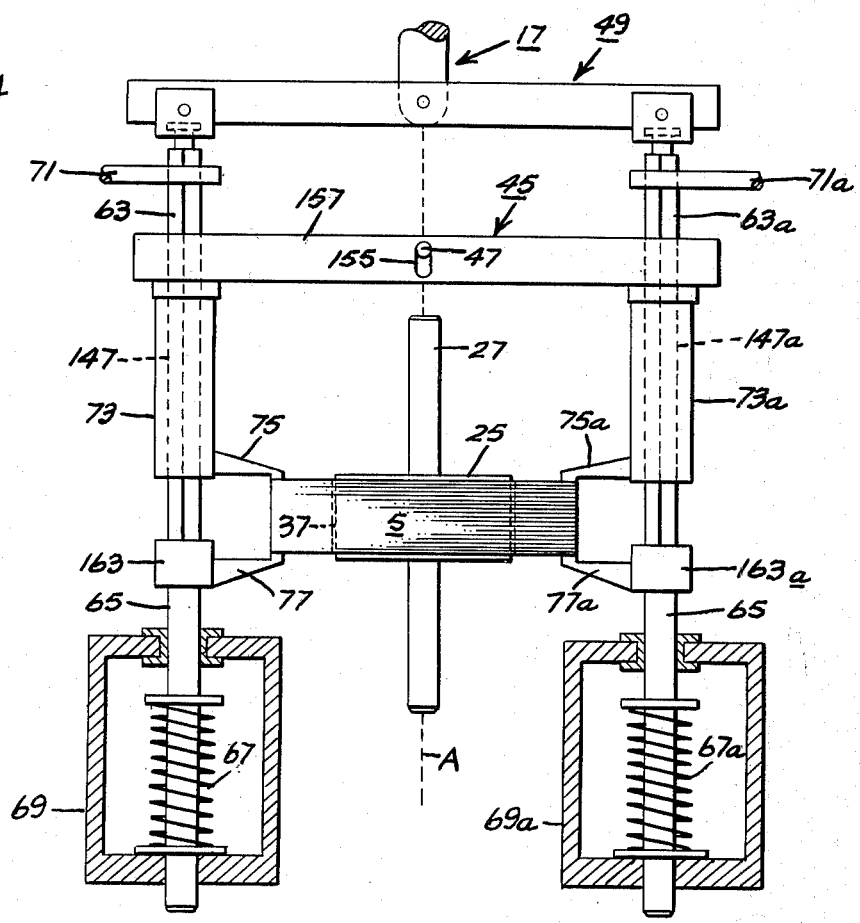
FIG. 4 is a schematic view illustrating the rocker arms of the apparatus of FIG. 1 for effecting proper alignment of the dynamoelectric machine components.

Referring now also to FIG. 4, when upper and lower fixtures 9, 11 are so locked together, a rocker arm mechanism 45, which is provided in upper fixture 13, is movable therewith to a position pivotal about its trunnions 47, and another rocker arm mechanism, indicated generally at 49, which forms a portion of upper slide 17, is in its pivotal position when the upper slide drives the upper fixture to its position in locking engagement with the lower fixture. When fixture rocker arm 45 is in its pivotal position, the compressive forces of a plurality of springs 51 urge a plunger or shaft extension 53 carried by the fixture rocker arm into biasing engagement with the upper end of shaft 27 urging it and lower end plate 1 downwardly thereby to engage the lower end plate with lower fixture 15. Further, during movement of slide rocker arm 49 to its pivotal position, upper slide 17 acutates a slide or wedge device 55 carried in upper fixture 9 thereby to effect the release of a plurality of springs 57 therein for urging a wedge block 61 downwardly into biasing engagement with upper end frame 21 to bias it into engagement with rotatable assembly 23. In this manner, when both fixture and slide rocker arms 47, 49 are in their pivotal positions, rotatable assembly 25 and end frames 1, 31 are resiliently urged together or locked in predetermined positions by the compressive forces of springs 51, 57 as further discussed hereinafter.

During movement of slide rocker arm 49 to its pivotal position, a pair of generally square, laterally spaced arms or rods 63, 63a thereof abut and conjointly drive another pair of generally square, laterally spaced rods 65, 65a downwardly against the compressive forces of a pair of springs 67, 67a biased between the lower ends of rods 65, 65a and a wall of a pair of spring chambers 69, 69a provided in lower fixture 11. A pair of rotatable or rotating levers 71, 71a are actuated by suitable means (not shown) to controllably effect rotation of rods 63, 63a thereby to drivingly rotate a pair of sleeves 73, 73a which are pivotally mounted on fixture rocker arm 45 and slidably mounted in upper fixture 13, and in turn, sleeves 73, 73a rotatably drive rods 65, 65a. In this manner, a pair of stopping means, such as upper fingers or stops 75, 75a, and a pair of clamping means, such as lower fingers or clamps 77, 77a, which are fixedly secured to sleeve 73, 73a and rods 65, 65a, respectively, are rotated inwardly into juxtaposition with the upper and lower end or end faces of stator 5.

At this time, upper slide 13 is retracted slightly upwardly therby permitting the compressive forces of springs 67, 67a to conjointly move fixture rods 65, 65a upwardly in following engagement with slide rods 63, 63a to drivingly engage clamps 77, 77a with the lower end of stator 5. Since stator 5 is out-of-square, as previously mentioned, both the upper and lower ends thereof have high and low portions or surfaces thereon; therefore, one of clamps 77, 77a engages the stator lower end high portion prior to the engagement of the other of clamps 77, 77a with the stator lower end low portion. Assuming arguendo that clamp 77 engages the stator lower end high portion, further movvement of the clamp is resisted, and clamp 77a is then movable relative thereto in response to the compressive force of spring 67a into engagement with the stator lower end low portion. Such relative movement of clamp 77a conjointly drives rods 65a and 63a upwardly to pivot slide rocker arm 49, and in this manner, pivoting of the slide rocker arm allows clamp 77a to move upwardly relative to clamp 77.

When clamps 77, 77a each are engaged with the lower end of stator 5, as above described, springs 67, 67a are again effective to cause further conjoint upward movement of the clamps thereby to conjointly drive the stator upwardly on shims 33 moving stator bore 37, generally coaxially along axis A or rotatable assembly 23 for engaging the upper end of the stator with stops 75, 75a. Since stator 5 is out-of-square, one of stops 75, 75a will be engaged by the stator upper end high portion prior to the engagement of the other of stops 75, 75a with the stator upper end low portion. Assuming arguendo that stator upper end high portion first engages stop 75, it is then movable upwardly in response to the compressive force of springs 67, 67a acting on stator 5 relative to stop 75a which, in turn, causes slide rocker arm 49 to pivot thereby moving stop 75a downwardly to effect engagement with the stator upper end low portion. With stops 75, 75a so pivoted by slide rocker arm 49 into respective engagement with the high and low portions on the upper end of stator 5, further conjoint movement of clamps 77, 77a and the stator is arrested, and the relative positions of the stops define the setting or assembly position of the stator with respect to rotatable assembly 23 and end frames 1, 21. It may be noted that stator 5 has been moved by clamp 77, 77a substantially coaxially of rotatable assembly 23 along axis A thereof to the assembly position of the stator without canting or skewing the stator with respect to axis A of the rotatable assembly.

Figure 3:
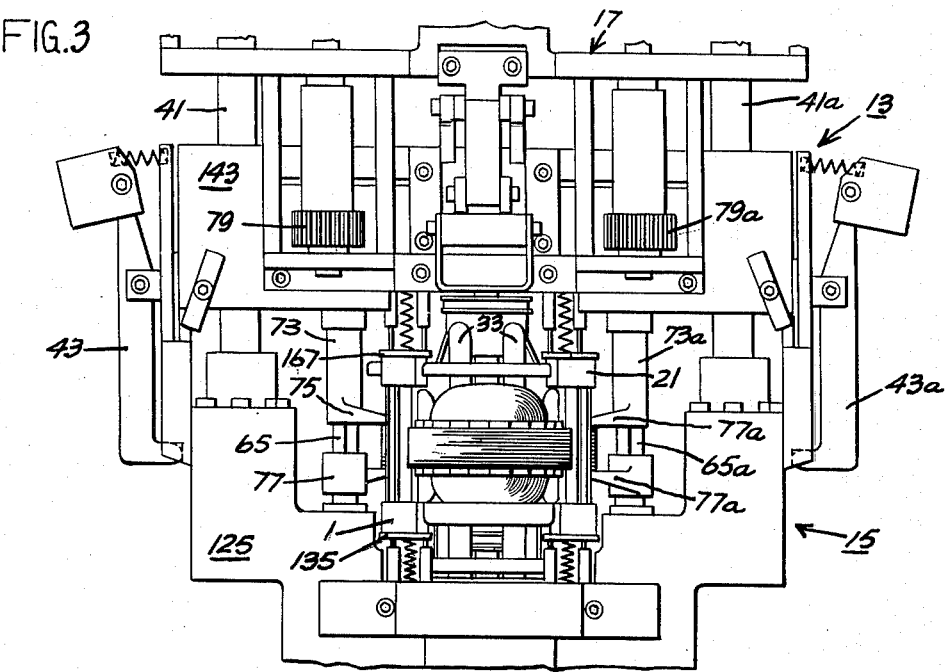
FIG. 3 is a rear elevational view of the apparatus of FIG. 1.

With stator 5 in its assembly position, a pair of driving gears 79, 79a provided on upper slide 13, as shown in FIG. 3, are drivingly engaged with means, such as locking devices 81, 81a shown in FIGS. 1 and 2, for locking the stator in its assembly position. For the sake of simplicity only locking device 81 is shown in cross-section, but the corresponding parts of locking device 81a is described hereinafter and designated by the letter a. Locking devices 81, 81a generally comprise a pair of gears 83, 83a rotatably supported in upper fixture 9 and driven by slide gears 79, 79a upon actuation thereof by suitable means (not shown). When driven gears 83, 83a are so rotated, they drive annular worm gears or screw devices 85, 85a operatively associated therewith for actuating male and female or annular wedge members 87, 89 and 87a, 89a between releasing positions and tightened or locking positions engaged between lower fixture 15 and the peripheries of sleeves 73, 73a. In this manner, slide gears 79, 79a are drivingly meshed with locking gears 83, 83a which drive worm gears 85, 85a downwardly wedging male and female wedges 87, 89 and 87a, 89a into locking engagement between upper fixture 9 and sleeves 73, 73a thereby to obviate further pivotal or rotational movement of the sleeves and lock stator 5 in its assembly position.

Having locked stator 5 in its assembly position against further movement is response to the compressive forces of springs 67, 67a, upper slide 11 is now retracted by suitable means (not shown) upwardly to its original or at-rest position disengaging rods 63, 63a of rocker arm device 49 from upper fixture 11 and at the same time permitting wedge 55 (FIG. 5) to return to its original position in engagement with wedge block 61 lifting it from engagement with upper end frame 21 against the compressive forces of springs 57. Lower slide 15 is also moved downwardly to its original or at-rest position by suitable actuating means (not shown), and prior to such downward movement, the lower slide disengages bayonet means 91 thereof from cooperating abutment means, such as opposite flanges 93, 93a, on generally cylindric shim actuating member 95. When lower slide 19 is in its original position and bayonet means 91 is rotated to a position disengaged from flanges 93, 93a, fixture 13, 15 may be selectively mounted to the casting station of the automatic motor assembly machine (not shown).

To introduce end-play into dynamoelectric machine 7, sensing or locating means, such as a screw 101, is rotated by means of a torque limiting device, such as an over-running or slip clutch mechanism or the like (not shown) but represented by the rotational arrow R in FIG. 5, connected therewith, or if desired, such torque limiting device may be incorporated into the screw. Rotation of screw 101 effects threaded movement thereof through and relative to a nut 103 until the screw abuttingly engages a free end 104 or shaft 27 or a spacer 104a engaged therewith, if desired, thereby to sense or locate the position of the shaft free end, and upon such abutting engagement, the compressive force of springs 51 acting downwardly on shaft 27, as previously mentioned, resists or opposes further upward rotational movement of the screw thereby to cause the torque limiting device to slip or run free in a manner well known in the art. Upon determining the sensed position of shaft lower or free end 104, other actuating means, such as a cylinder or the like (not shown), applies force F onto nut 103 conjointly driving it, a spacer 105 carried thereby, and screw 101, which constitute shaft end sensing assembly 107, upwardly through a predetermined distance or travel T between the spacer and movement limiting means, such as an abutment 109, disposed about a bore 111 in lower fixture 15 in which the shaft end sensing assembly is movable. In this manner, upward movement of shaft end sensing assembly 107 through travel T conjointly drives rotatable assembly 23 relative to lower end plate 1 from the sensed position of the lower end 104 of shaft 27 to a displaced position thereby introducing or inserting a predetermined amount of end-play, which is substantially equal to travel T, into dynamoelectric machine 7 between rotatable assembly 23 and lower end frame 1, and upper end frame 21 is conjointly movable upwardly with rotatable assembly 23 upon the introduction of the end-play, as above described.

Figure 7:
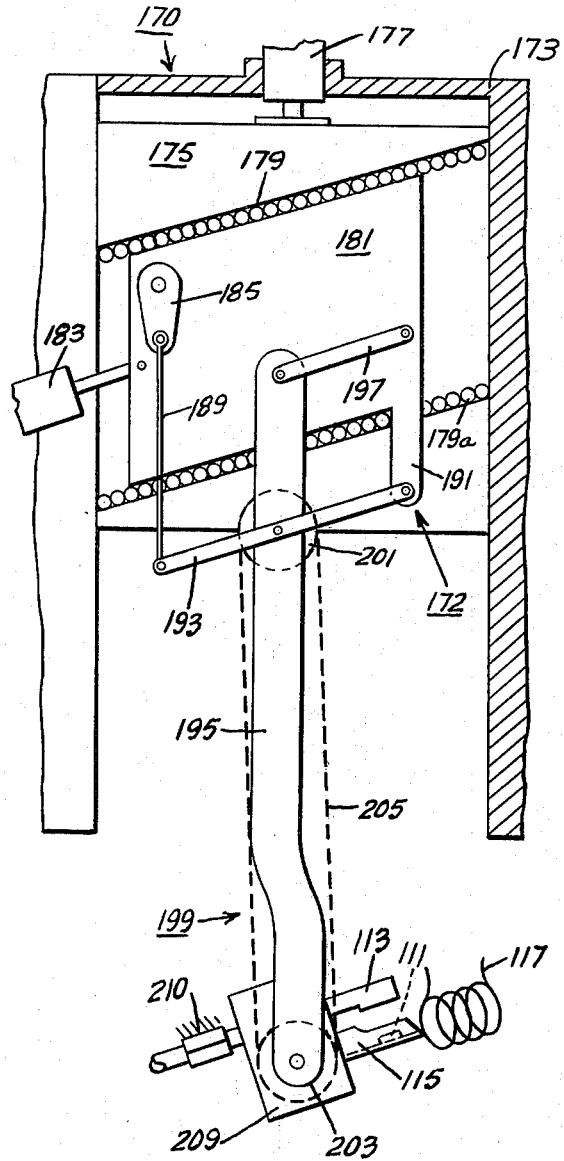
FIGS. 7, 8, 9 and 10 are schematic views illustrating apparatus associated with that of FIG. 1 for casting metal to establish a rigid connection between an end plate and another structural component of the dynamoelectric machine.
Figure 8:
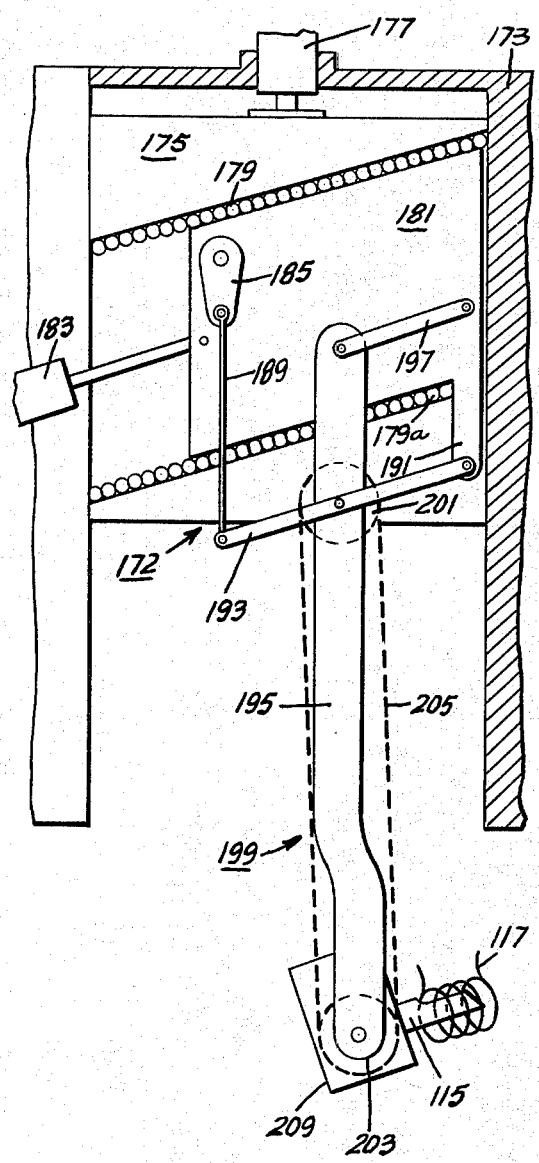
Figure 9:
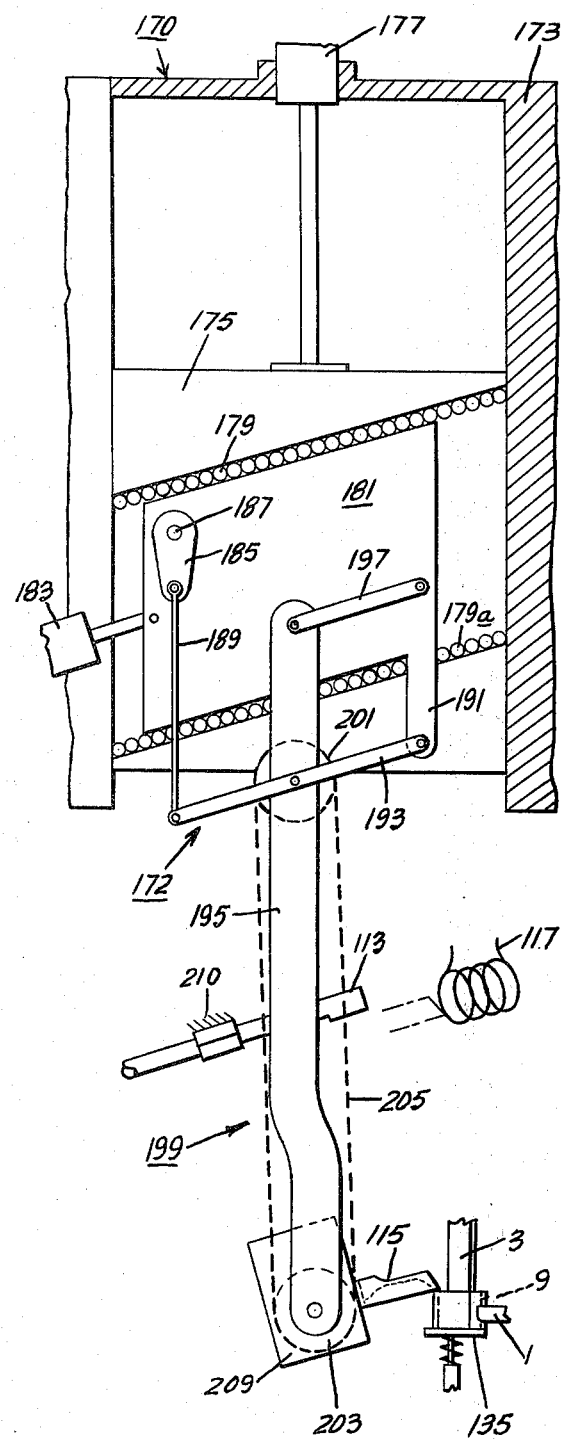
Figure 10:
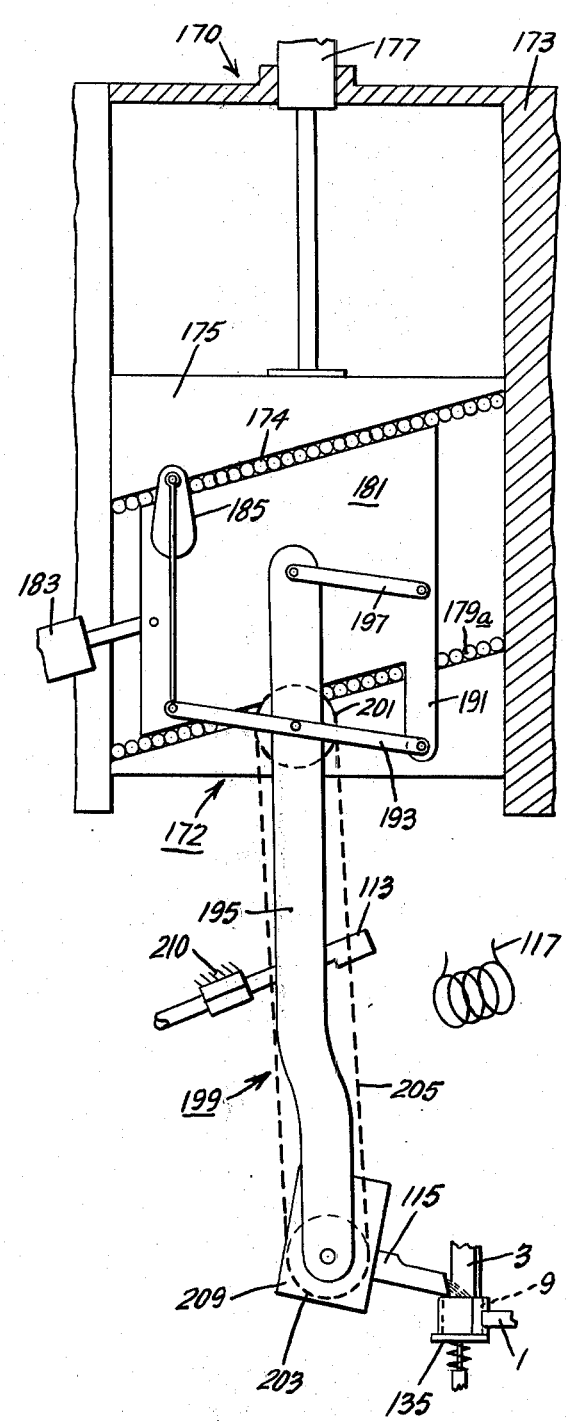

Referring now in general to FIGS. 7–12, a method of casting metal is shown by supplying metal, such as disc or cylindric pellets 111 of zinc, lead, aluminum or the like or various alloys thereof (FIG. 11), in its solid state to a receptacle, such as a pellet receiving transfer mechanism 113. Metal pellet 111 is then transferred in its solid state from receptacle 113 into means, such as a casting ladle 115, for casting the metal. Thereafter, metal pellet 111 is melted in casting means 115 by suitable means well known in the art, such as an RF heater 117 or the like (FIG. 8), and the casting means is moved to a metal casting position (FIGS. 9 and 10).

More particularly and with reference to FIGS. 7 and 11, when fixture 13, 15 having dynamoelectric machine 1 therein with its components in their assembly positions is disposed at the casting station, pellet 111 of a predetermined volume or amount of metal is supplied from a source thereof (not shown) into a chamber 119 or receptacle 113, and upon upward movement of the ladle toward the receptacle, a wiping block or abutment 120 wipes or engages a trigger mechanism 121 to cock or actuate it thereby to open a means, such as an opening or passage 123 in the receptacle 113 for transferring or depositing the pellet from the chamber into the ladle. With the pellet 111 transferred in its solid state from chamber 119 of receptacle 113 to ladle 115, the ladle enters RF heater 117, as shown in FIG. 8, and the metal is melted being transformed to its molten state for subsequent casting. Ladle 115 is thereafter further movable downwardly to a position juxtaposed with socket 9 of one of the end frames 1, 21 of dynamoelectric machine 7 which is predeterminately positioned in the casting station, as shown in FIG. 9, and the ladle 115 is thereafter tipped or moved to its casting position, as shown in FIG. 10, casting or pouring the molten metal therefrom into the end frame socket 9 for solidification thereby to establish a connection between at least a part of the end frame within the socket and the free end of beam 3 which, as previously mentioned, is disposed in its assembly position within the socket.

More particularly, apparatus 11 comprises upper and lower slides 17, 19, which are also components of the automatically operable motor assemblying machine (not shown), and the upper and lower slides function to actuate upper and lower fixtures 13, 15 at a work station of the assemblying machine, as previously mentioned. Lower fixture 15 is provided with a frame 125 having pairs of opposite guide or bearing means 127, 127a and 129, 129a in which guide pins 41, 41a and fixture rods 65, 65a are respectively received for generally linear vertical movement, and spring chambers 67, 67a are suitably attached to the lower end of the frame, as shown in FIGS. 1 and 2. Locating aperture 31 is centrally disposed in fixture frame 125 having shim slots 35 spaced thereabout, and a pivotal mounting cap 131, as also shown in FIG. 5, is pivotally disposed on the fixture frame about the locating aperture for positioning engagement with lower end frame 1. Between locating aperture 31 and shim slots 35, there is mounted end frame positioning means, such as a pair of clips 133, which may be cammed into gripping positioning engagement lower end frame 1 when it is positioned on the fixture frame. A plurality of spring loaded, heat resistant pads 135 of asbestos or the like are disposed about slots 29 for closing the lower ends of socket 9 in lower end frame 1, and these pads are depressable by the lower end frame 1 placed thereon toward engagement with abutments or stops 137 provided therefor on fixture frame 113. A guide cylinder 139 is centrally attached by suitable means to the lower end portion of fixture frame 125, and a cylindric member 95 is reciprocally movable thereon for protractively and retractively moving shims 33 through their slots 35. Quick disconnect means, such as a plurality of latches 141, are pivotally mounted on cylindric member 95 for positioning engagement with shims 33 and facilitating quick-release thereof whenever it is necessary to change shims.

Upper fixture 13 is provided with a frame 143 in which guide pins 41, 41a are fixedly received, and locking arms 43, 43a are pivotally mounted on opposite ends of the fixture frame. As also schematically shown in FIG. 5, wedge block 61 is reciprocably mounted centrally of fixture frame 143, and a pivotal mounting cap 145, through which the upper end portion of dynamoelectric machine shaft 29 extend, is pivotally disposed in the lower end of the wedge block for pivoted positioning engagement with dynamoelectric machine upper end frame 21. Springs 57 are engaged between a portion of fixture frame 143 and wedge block 61 urging it downwardly toward engagement with dynamoelectric machine upper end frame 35, and wedge 55 is slidably received in the fixture frame for engagement with a cooperating surface 147 on wedge block 61. A bell crank 149 is also pivotally mounted on fixture member 143 for actuation by upper slide 17, as discussed hereinafter, and spring means 151 urges the bell crank toward resilient driving engagement with wedge 55 for selectively engaging it with wedge block surface 147 to contain the compressive forces of springs 57.

Fixtures rocker arm 45 is provided with a trunnion block 153 which is vertically reciprocably movable in fixture frame 143, and shaft extension 53 is connected to the trunnion block 153 which is vertically reciprocably movable in fixture frame 143, and shaft extension 53 is connected to the trunnion block and conjointly movable therewith for abutting engagement with the upper end of the dynamoelectric machine shaft 27. Springs 51 are engaged between a portion of fixture frame 143 and trunnion blcok 153 for urging shaft extension 53 toward engagement with the upper end of shaft 27, and opposite trunnions 47 provided on the trunnion block extend laterally through opposite elongate pivot slots 155 in a pivotal or rockable yoke or arm member 157. A pair of pivotal connecting members 159, 159a are pivotally connected to yoke 157 adjacent its opposite ends, and the upper ends of sleeves 73, 73a extend through the connecting members in fixed engagement therewith. Sleeves 73, 73a are journaled in fixture frame 143 for generally vertically reciprocal movement, and generally square bores 161, 161a extend through the sleeves for receiving fixture rods 65, 65a and slide rods 63, 63a which have a cross-sectional configuration generally complementary to that of the sleeve bores wherein the sleeves may also be drivingly rotated in the fixture frame and connecting members 159, 159a. Driven gears 83, 83a rotatably mounted in fixture frame 143 for driving worm gears 85, 85a which are disposed about the periphery of sleeves 73, 73a and drive male and female wedges 87, 89 and 87a, 89a for locking engagement between a portion of the fixture frame and the periphery of the sleeves.

Clamping means 77, 77a are integrally formed with mounting collars 163, 163a therefor which are fixedly positioned on fixture rods 65, 65a by suitable means (not shown), and when upper slide 17 is in its raised or at-rest position disassociating its rods 63, 63a from fixture rods 65, 65a, springs 67, 67a urge the mounting collars upwardly into engagement with the lower ends of sleeves 73, 73a thereby to move the sleeves and yoke 157 upwardly. This upward movement of yoke 157 engages the bottom portion of elongate slots 155 with trunnions 47 of trunnion block 153 to effect conjoint movement thereof upwardly toward a raised, at rest or non-pivoting position for caging the forces of springs 51 and disengaging plunger 53 from the upper end of dynamoelectric machine shaft 27. A push pin 165 is provided on upper slide 17 for engagement with bell crank 145, and when the upper slide is in its raised position disassociating the plunger from the bell crank, bell crank spring 151 urges wedge 55 toward engagement with wedge block surface 147 to contain the forces of springs 57. To complete the description of apparatus 17, other spring loaded, heat resistant pads 167 of asbestos or the like are carried on fixture frame 143 for engagement with upper end frame 21 about sockets 9 therein, as shown in FIG. 1.

As previously mentioned, screw 101, nut 103 and spacer 105 generally constitute shaft end sensing assembly 107, and the screw is driven by a torque limiting device, such as an over-running or slip clutch mechanism or the like (not shown) but represented by the rotational arrow R in FIG. 5; however, if desired, such torque limiting device may be incorporated into the head of the screw, as well known in the art. Shaft end sensing assembly 107 is movably mounted in bore 111 provided in the lower end of cylinder 139 attached to frame 143 of lower fixture 15, and opposed abutments or seats 109, 171 are provided on the cylinder about the bore thereof for abutment or movement limiting engagement with nut 103 and spacer 105 respectively. Nut 103, in which screw 101 is threadedly received for engaging the lower end of shaft extension to sense the position thereof relative to end frame 1, is normally positioned in seating or abutting engagement with lower abutment 171, and the predetermined amount of end-play for introduction into dynamoelectric machine 1 is defined by travel T between spacer 105 and upper abutment 109.

Referring now in general to FIGS. 7-12, there is shown apparatus 170 having means, such as ladle 115, for casting metal melted therein. Means, such as receptacle 113 is provided for receiving a predetermined amount of metal in a solid state and includes means, such as opening 123, for depositing the entire amount of the metal into casting means or ladle 115. Means, such as a linkage assembly indicated generally at 172, is provided for moving the casting means to a metal casting position when the metal therein is melted.

At the casting station of the automatic motor assembly machine (not shown), a housing 173 is provided in which a block or guide 175 is reciprocably movable by suitable actuating means therefor, such as a double-acting air cylinder 177 or the like, as shown in FIGS. 7-10. Conveyor means, such as parallel runs or races of rollers or bearings 179, 179a are provided in guide 175 extending therethrough at a predetermined angle, and a shuttle or block 181 is reciprocably movable on rollers 179, 179a by suitable actuating means, such as another double-acting air cylinder 183 or the like.

Linkage assembly 172 comprises a crank 185 having one end rotatably connected at 187 to shuttle 181 while a side linkage or arm 189 is pivotably connected with the other end of the crank, and another side linkage or arm 191, which is generally parallel to link 189 extends integrally from the lower end of shuttle 181. A cross-link 193 is pivotally interconnected between the distal ends of side links 189, 191, and a support arm 195 for the casting receptacle 113 and ladle 115 is pivotally mounted on said cross-link adjacent the mid-portion thereof. A connecting link 197 is pivotally connected between the upper end of support arm 195 and the mid-portion of side link 191 being generally parallel with cross-link 193. A sprocket and chain drive means, indicated generally at 199, for driving ladle 115 is provided with upper and lower sprockets 201, 203 rotatably mounted on support arm 195, and a drive chain 205 is connected or run about the sprockets, said upper sprocket being drivenly connected with cross-link 193 and rotatable therewith about support arm 195.

Referring now also to FIGS. 11 and 12, ladle 115 and a rotary solenoid 207 for effecting inversion thereof, as discussed hereinafter are carried on mounting means 209 which is interconnected by suitable means well known in the art (not shown) for pivotal movement with lower sprocket 203 for conjoint rotation therewith.

Receptacle 113 is mounted at 210 on a stationary part of the automatic motor assembly machine (not shown) and provided with a pair of concentric tubes 211, 213 through which pellet 111 is supplied for entry into pellet chamber 119. A pair of slots 215, 217 are respectively provided in tubes 211, 213 and are normally angularly displaced from each other thereby to close pellet chamber 119 preventing the transfer of any pellet 111 therefrom, said slots 215, 217 generally constituting opening 123. Trigger mechanism 121 is provided with a torsion spring 219 engaged between a pair of stationary and rotatable posts 221, 223, and a resilient locking member or trip 225 is disposed on the stationary post in locking or displacement preventing engagement with the rotary post. Outer concentric tube 211 is drivenly connected for conjoint rotation with rotatable post 223 upon wiping engagement of trip 225 with support arm abutment 195, and a cocking lever 227 is integrally formed with the rotatable post for engagement with the support arm abutment upon downward movement thereof to return or re-rotate the rotatable post to its original position in locking engagement with the trip after pellet 111 has been delivered to the ladel, as discussed hereinafter.

The ladle 115 is rotatably supported in its mounting 209, and a recess portion or spout 229, into which pellet 111 is deposited, is provided in the rightward end of the ladle. To complete the description of casting apparatus 207, a gear 231 is drivingly connected to ladle 115 on its leftward end for effecting rotation thereof to empty any residue of metal which may remain in spout 229 subsequent to the casting operation, as discussed hereinafter, and another gear 233 carried by rotary solenoid 235 is drivingly meshed with ladle gear 231.

In the operation, with rotatable assembly 23 and lower end frame 1 of dynamoelectric machine 7 assembled on lower fixture 15, as previously described, at the work loading station of the automatic motor assembly machine (not shown), bayonet member 91 of lower slide 19 is initially rotated into position for engagement with flange 93 of cylindric member 95, and the lower slide is then actuated upwardly driving the cylindric member and shims 33 connected therewith upwardly to the protracted position of the shims extending through their slots 35 in lower fixture 15 and being disposed about the periphery of the rotatable assembly. The operator then loads stator 5 and upper end frame 21, as previously described, and upper slide 17 is lowered from its original at-rest or raised position by actuating means therefor (not shown) to its lowered or pivoting position conjointly driving upper fixture 13 downwardly therewith on guide pins 41, 41a journaled in bearing means 127, 127a toward engagement with lower fixture 15 wherein locking arms 43, 43a are pivoted into locking engagement with mating portions on the lower fixture thereby to lock the upper and lower fixtures together.

Upon the lowering of upper slide 17, rods 63, 63a thereof engage fixture rods 65, 65a driving them downwardly against the compressive forces of springs 67, 67a and disengaging clamp collars 163, 163a from abutment with sleeves 73, 73a. Upon disengagement of clamp collars 163, 163a from sleeves 73, 73a, springs 51 urge trunnion block 153 downwardly engaging its plunger 53 with the upper end of shaft 27, and in this manner, opposite trunnions 47 on the trunnion block are now disposed in a set stationary or pivoting position thereby to pivotally engage with elongate slots 155 in yoke 157 which defines the pivoting position or rocker arm 45. At the same time, driving gears 79, 79a are moved downwardly with upper slide 13 into mesh with driven gears 83, 83a, and upper slide push pin 165 engages and pivots bell crank 145 against its spring 151 thereby to move wedge 55 to a position disengaged from its cooperating surface 147 on wedge block 61 and release the compressive force of springs 57 urging the wedge block downwardly into position engagement with upper end plate 21. In this manner, rotatable assembly 23 and upper end frame 21 are clamped or maintained in their respective assembled position with axis A of the rotatable assembly generally perpendicular due to the locating engagement of shaft 27 in locating aperture 31 of lower fixture 15 and with bearing means 39 of the upper end frame journaled on the upper end of the shaft.

With both rocker arms 45, 49 now in their pivoting positions, levers 71, 71a are actuated by air cylinders or other suitable actuating means (not shown), as well known in the art, to controllably rotate slide rods 63, 63a and due to the complementary configurations of the slide rods, sleeve bores 161, 161a and fixture rods 65, 65a, such rotation of the slide rods effects conjoint rotation of sleeves 73, 73a and the fixture rods thereby to pivot stops 75, 75a and clamps 77, 77a inwardly toward position juxtaposed with the upper and lower ends of stator 3, respectively. At this time, upper slide 17 is automatically raised a slight distance thereby to permit the compressive force of springs 67, 67a to urge fixture rods 65, 65a upwardly for engaging clamps 77, 77a with the lower end of stator 5, and in the pivoting position of rocker arm 45, its trunnions 47 are located on pivoting engagement with the upper end of elongate slots 155 of yoke 157, as shown in FIGS. 1 and 4. As previously mentioned, clamp 77 is assumed to initially engage the stator lower end high portion, and upon such engagement, the various frictions between associated components as well as the inertia of the stator counteracts or contains the compressive force of spring 67 thereby to obviate further upward movement of fixture rod 65 and clamp 77. However, at the same time, the compressive force of spring 67a continues to move fixture rod 65a and clamp 77 upwardly relative to the engaged clamp 77 until clamp 77a engages the stator lower end low portion. At this time, the compressive force of spring 67a is additive to that of spring 67 since both now act on stator 5 through the engagement therewith of clamps 77, 77a and the additive forces of springs 67, 67a are great enough to effect upward movement of stator bore 37 on shims 33 substantially coaxially with axis A of rotatable assembly 23. Upon the upward movement of clamps 77, 77a into engagement the stator 5 and the subsequent conjoint upward movement thereof, it may be noted that fixture rod 65a follows slide rod 63a thereby to effect pivotal movement of pivot arm 49 to permit slide rod 63 to follow fixture rod 65, and in this manner, the pivoting actuation of rocker arm 49 compensates for the out-of-square low and high portions on the lower end of stator 5 which, of course, allows the stator to be moved upwardly substantially coaxially with axis A of rotatable assembly 23.

Upon the further conjoint upward movement of stator 5 and clamps 77, 77a in response to the additive compressive force of springs 67, 67a, the stator upper end high portion is assumed to effect initial engagement with stop 75, as previously mentioned, and in response to such engagement, stop 75 is driven or moved upwardly relative to stop 75a. Since stop 75 and sleeve 73 are integral parts of rocker arm 45, the upward relative movement of stop 75 effects pivotal movement of the rocker arm about trunnions 47 thereby to pivotally move opposite sleeve 73a and stop 75a downwardly toward engagement with the lower portion on the upper end of stator 5. When stop 75a and stator upper end low portion engage each other with stop 75 engaged with the stator upper end high portion, as mentioned above, rocker arm 45 is then in its steady state, i.e., not being able to be further pivotally actuated or moved, and the upward movement of stator 5 toward its assembly position is arrested. In this manner, it may be noted that the relative generally vertically spaced apart positions of stops 75, 75a with respect to each other at which the upward movement of stator 5 is arrested defines the aligned or assembly position of the stator. Further, it may also be noted that the pivotal movement of rocker arm 45, 49 effected upon the engagement of clamps 77, 77a with the high and low portions on the lower end of stator 5 and also the engagement of the high and low portions on the upper end of the stator with stops 75, 75a, respectively, permits the upward movement of the stator bore 37 generally coaxially about the periphery of rotatable assembly 23 along its axis A to the assembly position of the stator without canting or skewing the stator with respect to the rotatable assembly axis thereby to compensate for the out-of-square upper and lower ends of the stator.

When stator 5 is in its assembly position, driving gears 79, 79a are actuated by suitable means, such as rotary solenoids or other actuators well known in the art, thereby to drivingly rotate driven gears 83, 83a which are meshed therewith. Worm gears 85, 85a which are meshed with driven gears 83, 83a are driven downwardly in response to the rotation of the driven gears thereby to wedge cooperating male and female locking members 87, 89 and 87a, 89a into locking engagement between frame 143 of upper fixture 9 and the periphery of sleeves 73, 73a. In this manner, the locking engagement of male and female locking members 87, 89 and 87a, 89a between upper fixture frame 143 and sleeves 73, 73a positively locks rocker arm 45 against further pivotal movement thereby to maintain stator 5 against displacement from its assembled positon.

With rocker arm 45 so locked against further movement, upper slide 17 is now raised to its original at-rest position disassociating its rods 63, 63a from upper fixture 13 and disengaging its push pin 165 from upper fixture bell crank 149; therefore, upon such disengagement, spring 151 effects pivotal movement of the bell crank thereby to drive wedge 55 into engagement with its cooperating surface 147 on wedge block 61 to contain the forces of wedge block springs 57. At substantially the same time, lower slide 19 is also retracted downwardly to its original at-rest position, but prior thereto bayonet member 91 is rotated out of engagement with flanges 93, 93a of cylindric member 95. In this manner, upper and lower slides 17, 19 are retracted to their original positions disassociated from fixture 13, 15 which may then be moved from its work loading station in the automatic motor assembly machine to the casting station therein (not shown) after the introduction of end-play between components of dynamoelectric machine 7 for rigidly connecting stator beams 3 with end frames 1, 21.

Assuming now that fixture 13, 15 has dynamoelectric machine 7 disposed therein with its components in their assembly positions, as previously described, end-play is now introduced into the dynamoelectric machine, as shown in FIGS. 5 and 6. To introduce the end-play, screw 101 is threadedly rotated in nut 103 upwardly relative thereto by the torque limiting device, indicated generally by the rotational arrow R in FIG. 5, toward engagement with lower end 104 of shaft 27 or with the lower end of shaft spacer 104a if it is employed. Since the lengths of various shafts 27 of rotatable assembly 23 vary from one another and since tolerance build up permit shafts to extend various lengths or distances from lower end plate 1, it may be noted that it is necessary to sense or locate the true position of shaft end 104 in order to introduce a predetermined or constant amount of end-play into each dynamoelectric machine irrespective of variances in shaft lengths and tolerance buildups between components thereof. Upon making contact with shaft spacer 104a, the resistive force thereupon encountered by screw 101 causes the torque limiting device R to slip, and in this manner, further threaded upward movement of the screw is obviated once it so senses or locates the true position of shaft lower end 104.

With screw 101 in its sensing or locating position engaged with the shaft spacer 104a, actuating means (not shown) but indicated by the force arrow F in FIG. 6, is actuated to conjointly drive screw 101, nut 103, and spacer 105 upwardly relative to guide cylinder 139 disengaging the nut from its seat 171 and engaging the spacer with its movement limiting abutment 109. This upward movement of shaft end sensing assembly 107 conjointly drive rotatable assembly 23 and upper end frame 21 upwardly therewith relative to lower end frame 1 against the compressive forces of trunnion block and wedge block springs 51, 57 toward an end-play position in which the predetermined amount of end-play defined by travel T is introduced between rotatable assembly 23 and lower end frame 1. This conjoint upward movement for introducing end-play is limited by the engagement of spacer 105 with its cooperating abutment 109 on guide cylinder 139, and it may be noted that travel T therebetween defines the predetermined amount of end-play introduced between rotatable assembly 23 and lower end frame 1. Rotatable assembly 23 and upper end frame 21 are maintained in their displaced or end-play positions until stator beams 3 are rigidly interconnected with upper and lower end frame 1, 21, upon translation of fixture 13, 15 to the casting station.

When guide 175 is moved upwardly by its actuator 177, as shown in FIG. 7, ladle 115 is moved upwardly therewith into juxtaposition with recepticle 113, upon such upward movement wiping block 120 engages and moves trip 225 to a position displaced from rotatable post 223 permitting the force of torsion spring 219 to effect concerted rotation of the rotatable post and outer concentric tube 211. Upon rotation of tube 211, slot 215 therein is brought into registry with slot 217 of inner-concentric tube 213 thereby to establish opening 123, and metal pellet 111 which had been supplied into chamber 119 is transferred by gravity therefrom dropping through the opening into spout 229 of ladle 115. As shown in FIG. 8, shuttle actuator 183 thereafter moves shuttle 181 rightwardly on roller runs 179, 179a to an end position, and ladle 115 is conjointly movable with the shuttle toward a position entered into RF heater 117 thereby to heat metal pellet 111 in ladle spout 229 for changing the state thereof from solid to molten. After the change of state of metal pellet 111 occurs, shuttle actuator 183 retracts shuttle 181 to the position shown in FIG. 7, and guide actuator 177 thereafter moves guide 175 downwardly in housing 173 to the position shown in FIG. 9 wherein ladle 115 with molten metal therein is juxtaposed with socket 9 of end frame 1. As shown in FIG. 10, crank 185 is turned by suitable means (not shown) approximately 180° to actuate linkage assembly 170 which raises support arm 195 causing conjoint upward movement of ladle 115 therewith relative to end frame 1; however, the actuation of linkage assembly 172 to raise support arm 195 also effects rotation of upper sprocket 201 to drive chain 205 and conjointly rotate lower sprocket 203, and since ladle mount 209 is rotatably driven by the lower sprocket, ladle 115 is thereby tipped or pivoted to its casting position in which the molten metal is poured from ladle spout 229 into socket 9 of end plate 1 for solidification therein to establish a rigid connection between beams 3 and end frame 1. It may be noted that since stator beams 3 are generally U-shaped in cross-section; a passage is thereby provided through which at least a portion of the molten metal is poured during the casting operation, as described above, and ladle 115 is moved into juxtaposition relative to the stator beam and socket 9 to effect the pouring of the molten metal through the beam passage into the socket.

After the casting operation, crank 185 is returned to its original position which drives linkage assembly 172 to its original position, and upon the return of the linkage assembly to its original position, sprocket and chain drive 199 is reversely driven thereby to its original position thereby to pivot ladle mount 209 to its original position. At the same time, guide actuator 177 moves guide 175 upwardly in housing 173 to its original position wherein apparatus 170 is disposed as shown in FIG. 7. To complete the description of the operation, rotary solenoid 235 is energized driving meshed gears 233, 231 to effect rotation of ladle 115 in its mount 209 to an inverted position for emptying any metal residue from ladle spout 229 which may remain therein after the casting operation, and in this manner, the ladle is cleansed in preparation of receiving another metal pellet or slug 111 during the next cycle of casting apparatus 170.

Although only one apparatus 170 has been described hereinabove along with its casting operation, it is apparent that a plurality of such apparatus can be employed for simultaneously casting in place each of beams 3 within each of sockets 9 of end frame 1.

In view of the foregoing, it is now apparent that novel methods and apparatus for casting metal and for attaching an end frame and another structural component of a dynamoelectric machine are provided by way of illustration meeting all of the objects and advantageous features set forth hereinabove, as well as others noted in the specification, and that changes in the particular arrangements, shapes and details of components embraced by such novel apparatus, as well as variances in practicing such novel methods, may be made by those skilled in the art without departing from the spirit and scope of the invention, as set out in the claims which follow.

What I claim as new and desire to secure by Letters Patent of the United States is:

1. A method of attaching an end frame and another structural component of a dynamoelectric machine comprising the steps of:
    a. positioning the end frame and the structural component in an apparatus adapted to be actuated for automatically assembling them in an aligned assembly position with the structural component disposed within means for receiving it provided in the end frame;
    b. moving at least one of the end frame and the structural component with respect to the other thereof to the aligned assembly position upon actuation of the apparatus which effects such movement; and
    c. casting a metal into the receiving means for forming a rigid tie between the end frame and the structural component as as to fixedly interconnect them in the aligned assembly position against displacement therefrom while they are positioned in the apparatus.

2. The method as set forth in claim 1, comprising the additional step of permitting the cast metal sufficient time for solidifying and forming the rigid tie between the end frame and the structural component before moving them.

3. The method as set forth in claim 1, comprising the intermediate step of depositing a measured amount of the metal into means for casting it prior to the casting step.

4. The method as set forth in claim 1, comprising the intermediate step of actuating means for depositing a measured amount of the metal into means for casting it prior to the casting step.

5. The method as set forth in claim 1, comprising the intermediate step of mechanically moving means for casting the metal with the metal therein into juxtaposition with means for heating and melting the metal.

6. The method as set forth in claim 1, comprising the intermediate step of actuating means for depositing a slug of a predetermined amount of the metal into means for casting it and heating and melting the slug in the casting means prior to casting it.

7. The method as set forth in claim 6, wherein the intermediate step further comprises actuating means for mechanically moving the casting means into juxtaposition with means for effecting the heating and melting of the metal slug.

8. The method as set forth in claim 7, wherein the intermediate step further comprises further actuating with mechanically moving means so as to move the casting means with the molten metal therein adjacent the receiving means and pouring the molten metal into the receiving means.

9. The method as set forth in claim 7, wherein the intermediate step further comprises further actuating the mechanically moving means so as to move the casting means with the molten metal therein to a predetermined position adjacent both the receiving means and the structural component therein and pouring the molten metal from the casting means through passage means provided therefor in the structural component into the receiving means.

10. The method as set forth in claim 1, comprising the additional step of emptying any residue of the metal from a means for casting it.

11. The method as set forth in claim 10, wherein the additional step comprises inverting the casting means for emptying from it any of the metal residue remaining subsequent to the casting step.

12. The method as set forth in claim 11, wherein the inverting step comprises rotating the casting means to an inverted position.

13. A method of fixedly attaching an end frame and a plurality of structural beams of a stator for a dynamoelectric machine with a rotatable assembly thereof adapted to be rotatably disposed in the stator and rotatably supported in the end frame comprising the steps of:
 a. disposing the end frame, stator and rotatable assembly in an apparatus adapted to be actuated for automatically assembling them in an aligned assembly position with the end portions of the beams within a plurality of sockets provided therefor in the end frame;
 b. moving the stator generally coaxially along an axis of the rotatable assembly toward the aligned assembly position so that the rotatable assembly is rotatably disposed in alignment with at least the stator and thereby also aligning the end portions of the beams within the sockets in position for fixed assembly with the end frame upon actuation of the apparatus which effects such movement; and
 c. casting a metal into the sockets for forming a solidified fixed connection between at least a part of the sockets and at least a part of the end portions of the beams while the end frame, stator and rotatable assembly are positioned in the apparatus.

14. The method as set forth in claim 13, comprising the additional step of maintaining the end portions of the beams and the end frame in their assembled positions for a period of time at least permitting the solidfying of the cast metal.

15. The method as set forth in claim 13, comprising the intermediate step of operating a plurality of means for depositing metallic slugs each containing a predetermined amount of metal into a plurality of ladles for casting it.

16. The method as set forth in claim 15, wherein the intermediate step further comprises actuating a plurality of means for mechanically moving the ladles with the metal slugs therein into juxtaposition with a plurality of means for heating and melting the metal slugs, respectively.

17. The method as set forth in claim 16, wherein the intermediate step further comprises further actuating the mechanically moving means so as to move the ladles with the molten metal therein to positions adjacent the sockets, and tip the ladles for pouring the molten into the sockets, respectively.

18. The method as set forth in claim 17, wherein the beams are respectively provided with a recess portion therein at least adjacent the end portions thereof, and wherein the intermediate step further comprises positioning the ladles adjacent the recess portions as well as the sockets and pouring the molten metal from the ladles through at least a part of the recess portions upon tipping of the ladles for pouring the molten metal into the sockets.

19. A method of fixedly attaching a pair of structural components of a dynamoelectric machine comprising the steps of:
 a. positioning the structural components in an apparatus adapted to be actuated for automatically assembling them into an assembly position with one of the structural components disposed within means for accepting it in the other of the structural components;
 b. moving at least one of the one and other structural components with respect to the other thereof toward the assembly position upon the actuation of the apparatus which effects such movement; and
 c. providing in the accepting means a hardenable material and flowing it therein between at least a part of the one structural component and at least a part of the other structural component for forming therebetween a generally rigid tie so as to fixedly interconnect the one and other structural components in the assembly position against displacement therefrom while the one and other structural components are positioned in the apparatus.

20. The method as set forth in claim 19 wherein the hardenable material is generally constituted by a molten metal.

21. The method as set forth in claim 19 comprising the additional step of permitting the hardenable material sufficient time to harden thereby to establish the rigid tie between the one and other structural components.

22. The method as set forth in claim 19 wherein the providing and flowing step includes supplying at least a predetermined amount of the hardenable material in the accepting means for forming the rigid tie.

23. The method as set forth in claim 19 comprising the intermediate step of closing an end of the accepting means prior to the providing and flowing step.

24. A method of fixedly attaching an end frame and at least one generally elongate beam of a stationary assembly for a dynamoelectric machine comprising the steps of:
 a. positioning the end frame and the stationary assembly in an apparatus adapted to be actuated for automatically assembling them into an aligned assembly position with an end portion of the at least one generally elongate beam within means for encompassing it in the end frame;
 b. moving at least one of the end frame and the stationary assembly with respect to the other thereof so as to dispose them in the aligned assembly position with the end portion of the at least one generally elongate beam within the encompassing means upon the actuation of the apparatus which effects such movement; and
 c. providing in the encompassing means a hardenable material and flowing it therewithin between at least a part of the end frame and at least a part of the end portion of the at least one generally elongate beam for forming therebetween a generally rigid connection upon the hardening of the hardenable material so as to fixedly interconnect the end frame and the stationary assembly in the aligned assembly position and maintain the encompassing means and the end portion of the at least one generally elongate beam against displacement movement with respect to each other, said providing and flowing step occurring while the end frame and the stationary assembly are disposed in the apparatus.

25. The method as set forth in claim 24 wherein the hardenable material is generally constituted by a metal.

26. The method as set forth in claim 24 comprising the additional step of effecting solidification of the hardenable material through a sufficient period of time thereby to establish the rigid tie between the at least part of the end frame and the at least part of the end portion.

27. The method as set forth in claim 24 wherein the providing and flowing step includes supplying in the encompassing means a predetermined amount of the hardenable material.

28. The method as set forth in claim 24 comprising the intermediate step of closing an end of the encompassing means for maintaining therein the hardenable material prior to the providing and flowing step.

29. A method of fixedly attaching an end frame and at least one generally elongate beam of a stationary assembly for a dynamoelectric machine with a rotatable assembly thereof adapted to be rotatably disposed within the stationary assembly and rotatably supported by the end frame, said method comprising the steps of:
   a. disposing the end frame, stationary assembly and rotatable assembly in an apparatus adapted to be actuated for automatically assembling them into an aligned assembly position with an end portion of the at least one beam entered into means for receiving it in the end frame;
   b. moving at least one of the end frame and the stationary assembly with respect to the rotatable assembly toward the aligned assembly position in which the rotatable assembly is disposed in rotatable alignment with the end frame and the stationary assembly, said moving step occurring upon the actuation of the apparatus which effects such movement; and
   c. providing in the receiving means a hardenable material and flowing it therewithin between at least a part of the end frame and at least a part of the end portion of the at least one beam for establishing a generally rigid tie therebetween upon the hardening of the hardenable material so as to fixedly interconnect the end frame and the stationary assembly against displacement from the aligned assembly position with respect to the rotatable assembly, said providing and flowing step occurring while the end frame, stationary assembly and rotatable assembly are disposed in the apparatus.

* * * * *

UNITED STATES PATENT OFFICE
CERTIFICATE OF CORRECTION

PATENT NO. : 3,974,873
DATED : Aug. 17, 1976
INVENTOR(S) : Jesse A. Stoner

It is certified that error appears in the above-identified patent and that said Letters Patent are hereby corrected as shown below:

```
Col. 1, line 10, delete "," (third occurrence) and insert --(now
                 abandoned)--;
        line 60, delete "disadvantages" and insert --disadvan-
                 tageous--.
Col. 5,
        line 51, delete "therby" and insert --thereby--;
        line 62, delete "movvement" and insert --movement--.
Col. 6, line  8, delete "or" and insert --of--.
Col. 7, line  9, delete "mounted" and insert --moved--;
        line 67, delete "or" and insert --of--.
Col. 9, line 23, delete "blcok" and insert --block--.
Col. 14, line 42, delete "drive" and insert --drives--.
```

Signed and Sealed this

Fourth Day of January 1977

[SEAL]

Attest:

RUTH C. MASON
*Attesting Officer*

C. MARSHALL DANN
*Commissioner of Patents and Trademarks*